United States Patent
Belisle

(10) Patent No.: US 6,683,776 B2
(45) Date of Patent: Jan. 27, 2004

(54) METHOD AND APPARATUS FOR ELEVATING AND MANIPULATING OBJECTS USING FIELDS ONLY

(76) Inventor: William Redvers Belisle, 8181 Lake Forest Blvd., #24-317, New Orleans, LA (US) 70126

( * ) Notice: Subject to any disclaimer, the term of this patent is extended or adjusted under 35 U.S.C. 154(b) by 55 days.

(21) Appl. No.: 10/124,302

(22) Filed: Apr. 17, 2002

(65) Prior Publication Data

US 2003/0053278 A1 Mar. 20, 2003

Related U.S. Application Data

(63) Continuation-in-part of application No. 09/512,014, filed on Feb. 24, 2000, now abandoned.

(51) Int. Cl.$^7$ ............................................... H01H 47/00
(52) U.S. Cl. ........................ 361/144; 361/143; 361/147
(58) Field of Search .............................. 361/144, 160, 361/152, 115, 1, 143, 147

(56) References Cited

U.S. PATENT DOCUMENTS

| | | | | |
|---|---|---|---|---|
| 3,906,804 A | * | 9/1975 | Atkinson et al. | 74/5.7 |
| 4,521,854 A | * | 6/1985 | Rhim et al. | 700/90 |
| 4,910,633 A | * | 3/1990 | Quinn | 361/144 |
| 5,015,906 A | * | 5/1991 | Cho et al. | 310/309 |
| 5,404,062 A | * | 4/1995 | Hones et al. | 310/90.5 |
| 5,722,326 A | * | 3/1998 | Post | 104/281 |

\* cited by examiner

Primary Examiner—Stephen W. Jackson

(57) ABSTRACT

A magnetic field-producing device is used for non-contact type elevation, elevation maintenance, or manipulation of objects. This type of elevation, elevation maintenance, or manipulation of objects contributes to the present modes of flight and people and larger object transport including but not limited to rotary-wing or non-rotary-wing modes of flying and mechanical/electronic modes of object movement.

8 Claims, 9 Drawing Sheets

FIG. 8
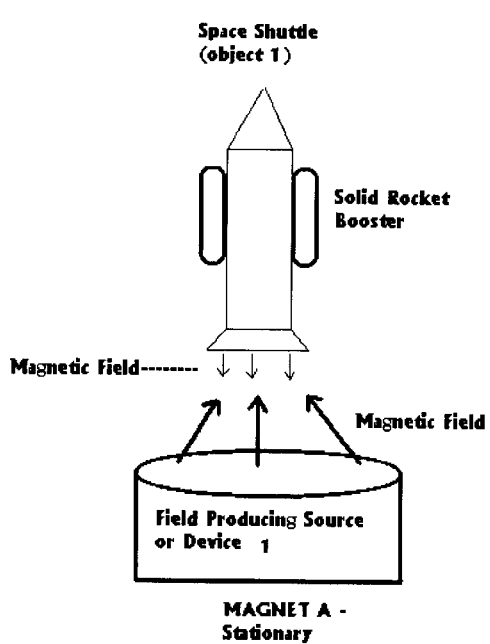
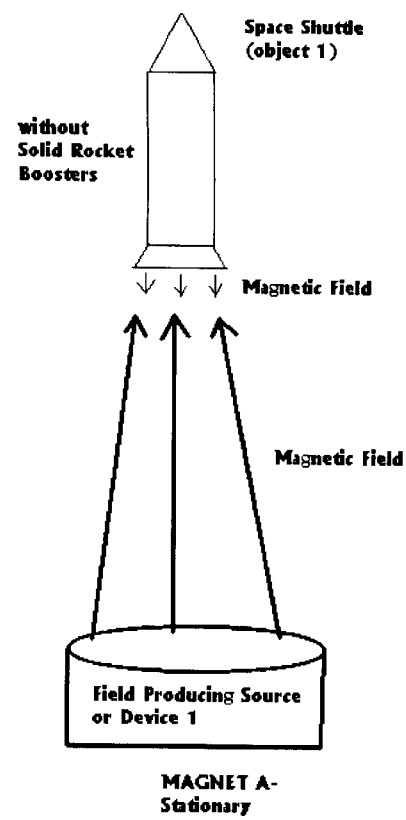

METHOD AND APPARATUS FOR ELEVATING AND MANIPULATING OBJECTS USING FIELDS ONLY

CROSS-REFERENCES TO RELATED APPLICATIONS

1. Linliu, Kung (Taipei, TW). 1999. 'Metallization process using artificial gravity'.
2. Wing, Michael L., 1996. 'Gravitational, magnetic, floating ball valve'.
3. Dulck, Jean F., 1996. 'Satellite and method to place this satellite in orbit by gravitational assistance'.
4. Takeda, Tsunehiro, Endo, Hiroshi, and Kumagai, Toru, 1999. 'Magnetic field source movable phantom head'.
5. Higuchi, Toshiro, Tsutsui, Yukio, Nogawa, Miyamae-ku, and Kawasaki-shi, Kanagawa, 1999. 'Non-contact magnetic suspension apparatus using distortions of pinned superconductor field'.
6. De Wit, Deceased, et al. 1999. 'Display device comprising a display tube having an external shield against the earth's magnetic field'.
7. Radhakrishnan, Gouri. 1999. 'Magnetic field pulsed laser deposition of thin films'.
8. Bornhofft, et al. 1986. 'Arrangement for remote sweeping of mines sensitive to magnetic fields'.
9. McDaniel, et al. 1980. 'Apparatus for electromagnetically generating fields for repelling or attracting permanent magnetic fields for the purpose of entertainment'.
10. Sheridon, Necholas K. 1998. 'Canted electric fields for addressing a twisting ball display'.
11. Criswell, David R. 1993. 'Vehicle propulsion system with external propellant supply'.
12. Kare, Jordan T. 1992. 'Reflector for efficient coupling of a laser beam to air or other fluids'.

STATEMENT REGARDING FEDERALLY SPONSORED RESEARCH AND DEVELOPMENT

Not Applicable

REFERENCE TO A "MICROFICHE APPENDIX"

Not Applicable

BACKGROUND OF INVENTION

1. Field of the Invention/Technical Field

The following is 'A statement of the field of art to which the invention pertains':
1. U.S. Class 438 Field of Search: 438/660
2. U.S. Class 604 Field of Search: 604/254
3. U.S. Class 244 Field of Search: 244/158R
4. U.S. Class 600 Field of Search: 600/409
5. U.S. Class 310 Field of Search: 310/90.5
6. U.S. Class 313 Field of Search: 313/402
7. U.S. Class 427 Field of Search: 427/571
8. U.S. Class 114 Field of Search: 114/312
9. U.S. Class 273 Field of Search: 273/345
10. U.S. Class 359 Field of Search: 359/296
11. U.S. Class 244 Field of Search: 244/1R
12. U.S. Class 60 Field of Search: 60/203.1

2. Description of the Related Art/Background Art

Present patents describe the use of gravity, magnetic, electrical, electromagnetic, or other artificial fields to remove voids in via (heated vias) holes in integrated circuits using magnetic repulsion (Linliu and Kung, 1999), to attract magnetic objects (Wing, 1996), and to maintain or connect satellite orbits about the moon with the assistance of the moon's gravitational pull (i.e. after the satellite has been placed in orbit . . . ) (Dulck, 1996). Patents for magnetic fields describe the use of such fields to move electrodes within closed vessels or tubes filled with a physiologic saline (Takeda, et al., 1999), to stably suspend in a non-contacting manner, by the combination of high temperature superconductor and a ferromagnetic member (Higuchi, et al., 1999), to at least compensate for the earth's magnetic field in at least two fields and an excitable coil to compensate for the component of the earth's magnetic field in the third direction (De Wit, et al., 1999), and to deflect charged species produced by a laser beam (Radhakrishnan, Gouri, 1999). McDaniel, et al. (1980) describe the use of magnetic fields to repel or attract permanent magnets in specially configured, non magnetic material as a part of a game used for entertainment purposes. Patents for magnetic fields also describe the use of magnetic fields to detect magnetic field mines (Bornhofft and Irenkler, 1986).

Patents for electrical fields describe the use of electrical fields to align and rotate electrically and optically anisotropic spheroidal balls in a substrate (Sheridon, 1998). Criswell (1993) describes the use of lasers or electromagnetic fields to energize the propellant trail of a rocket for combustion. Kare (1992) describes the use of a focused (using focusing mirrors) laser or electromagnetic energy to break down air or other fluids creating plasma. The plasma, which has absorbed energy from the laser, grows in volume and provides thrust.

The patents described above do not address the use of gravitational, magnetic, electrical, electromagnetic, or other fields only to directly elevate and manipulate objects (i.e. without converting laser or electromagnetic energy into fueled propulsive energy) similarly as objects are elevated and manipulated in rotary-wing and non-WinG-wing flight. Nor do the patents described above address the use of gravitational, magnetic, electric, electromagnetic, or other fields (only) to transport larger objects (i.e. without converting laser or electromagnetic energy into fueled propulsive energy) similar to automotive, machinery, or other modes of people or larger object transport (i.e. without converting laser or electromagnetic energy into fueled propulsive energy). Note that the present WinG-wing and non-WinG-wing modes of flight generally require the use of flammable, combustible, or other fuels.

To overcome these shortcomings, the present invention provides a mode of elevating and manipulating objects similar to wing and non-wing flight using gravitational, magnetic, electrical, electromagnetic, or other fields (i.e. without converting laser or electromagnetic energy into fueled propulsive energy). The present invention also provides a mode of transporting larger objects similarly to automotive, machinery, or other modes of people or larger object transport.

BRIEF SUMMARY OF INVENTION

It is the object of the invention to a) provide a mode by which objects may be elevated and manipulated by gravitational, magnetic, electric, electromagnetic, or other fields, b) provide a mode of flight comparable to WinG-wing and non-WinG-wing flight, and c) provide a mode of transport comparable to people and larger object transport such as automotive and machinery modes of transport.

BRIEF DESCRIPTION OF SEVERAL VIEWS OF THE DRAWINGS

FIG. 8 shows a very large or powerful stationary field producing source or device (Magnet A) exerting a magnetic towards the magnetic field exerted by object 1 (the space shuttle with and without two solid rocket boosters.

DETAILED DESCRIPTION OF THE INVENTION

References are to Illustrations

The present invention consists of a mode of elevating and manipulating objects using fields only that a) is equipped with at least one gravitational, magnetic, electric, electromagnetic, or other field producing source or device positioned as to exert or potentially exert the produced field onto or about an object, boundary, or surface of an object such that the object(s) is elevated (as in two flat-faced magnets of the same polarity facing each other, one above the other, for example) and manipulated by the field producing source, the elevated or manipulated object, or by other means (see FIGS. 1 through 9), b) is made, drawn, or designed such that the strength or degree of the field from the field producing source(s) or devices may be manipulated by the field source(s) or device(s), the elevated and manipulated object(s), or other entity, and c) equipped such that the field producing source(s) and the elevated and manipulated object(s) operate in a desired manner. As shown in FIG. 3, which shows and example using a magnetic or electromagnetic field producing device, a very large or powerful magnetic or electromagnetic field producing device is positioned in, on or about a location. The field producing device or source is made such that the strength, energy, or direction of the field, especially as the field affects the elevated and manipulated object, may be controlled. FIG. 1 through 9 also show the faces of smaller objects with the same or similar polarities as the field source(s) facing the field sources or devices. FIG. 1 through 9 are examples of the objects being repelled or pushed upward or about by the produced field. The strength or energy of the produced field may be initially zero or very small as in prior to pushing or as in initializing the push of the object in an upward direction; for example. The strength of energy of the field producing device or source may be increased or varied as to elevate and manipulate the object(s). Multiple field producing devices or sources (like the one shown in FIGS. 5 and 6) may be used as one effort to elevate and manipulate the object(s). The present invention consists of the elevated and manipulated object(s), the field producing device(s) or source(s), or other mechanisms that are made, drawn, or designed as to allow the object(s) to be manipulated or operated as desired.

Figure 1:
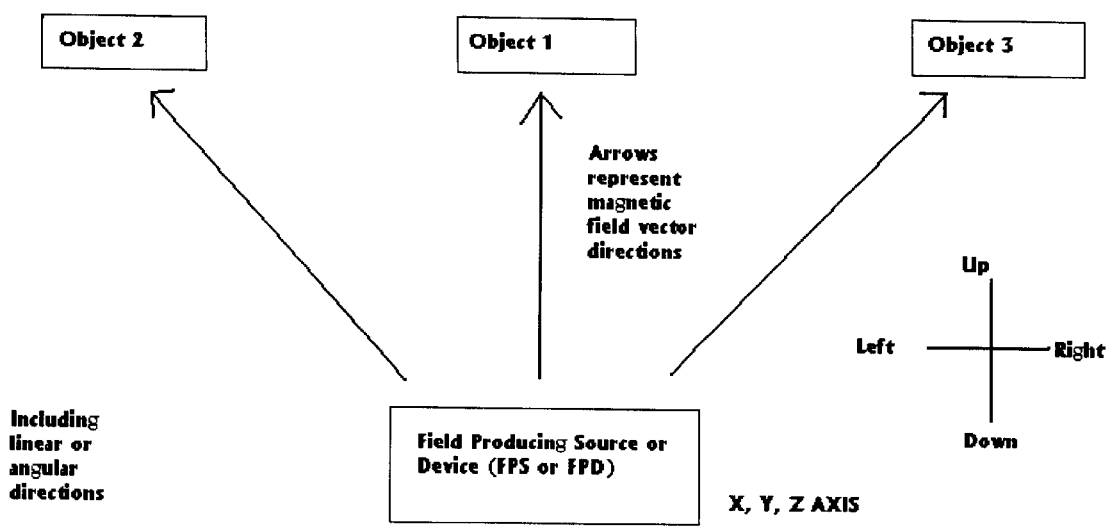
FIG. 1 shows the field producing source with objects in three example elevated positions such that the objects are able to be manipulated by the field source, by the object itself, or by other sources in upward, downward, left or right directions, or angular or circular directions along X, Y, or Z axes.
Figure 2:
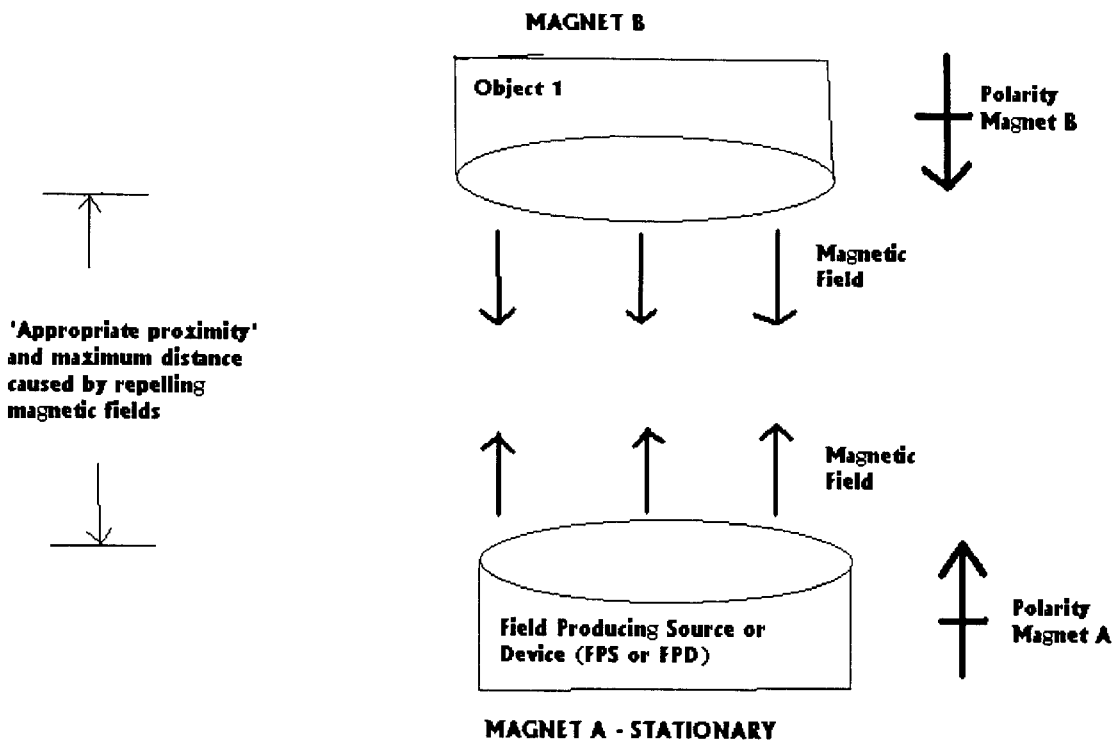
FIG. 2 shows two magnets A and B that have the same polarities facing each other.
Figure 3:
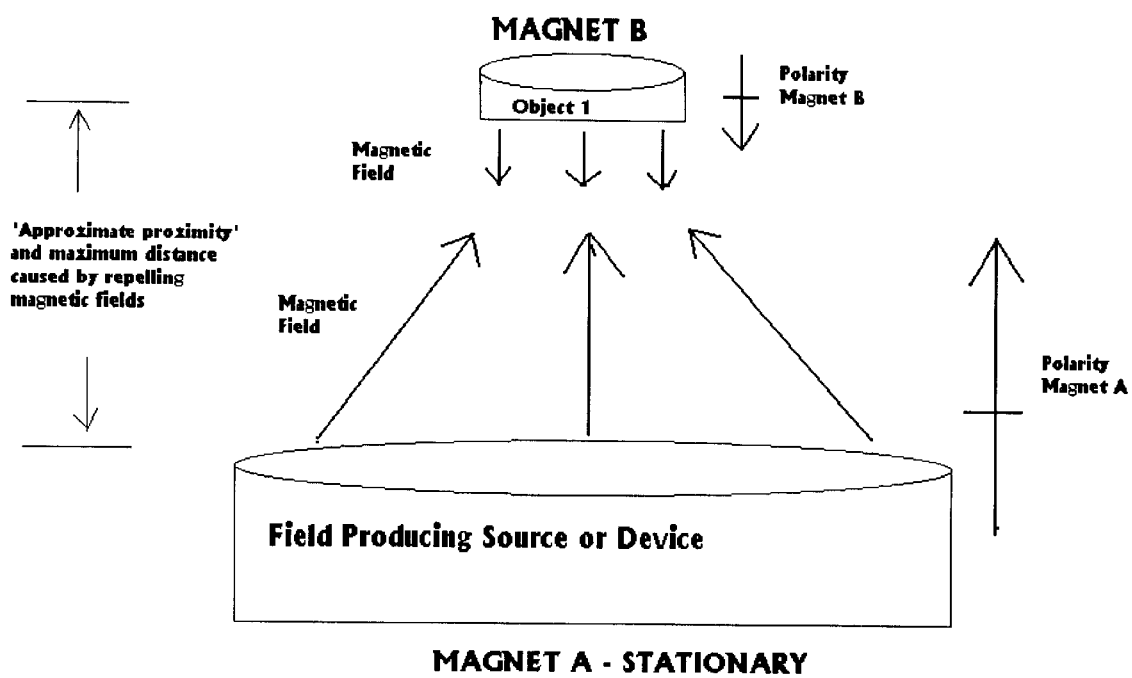
FIG. 3 shows two magnets including Magnet A, which is very large and stationary, and Magnet B facing each other as in FIG. 2.

Magnets A and Magnet B in FIG. 2 are identical. The faces of the magnets with the same magnetic field direction or polarity are directed towards each other. All objects and field producing sources may receive or emit magnetic, electromagnetic, gravimetric, or other field energy. The two magnets, therefore, repel each other when the two magnets are in approximate proximity (i.e. at a distance that allows the magnetic fields to interact). Considering a) the fact that the magnetic field strength of the magnet may be controlled, b) the fact that Magnet A is in a stable position (or platform), c) Magnet B is directly over Magnet A at a maximum degree of repulsion and hence at a maximum distance Magnet, and d) Magnet B is held in position above Magnet A only by the repelling magnetic fields produced by each magnet, decreasing the magnetic field strength of Magnetic A would result in less repulsion of Magnet B and hence a decrease in the distance between Magnets A and B. The magnetic field strength of Magnet A may be reduced until Magnet B became very close to Magnet A. At this point, the field strength of Magnet A may be increased such that Magnet B is repelled upward and away from Magnet A. The fields produced in the FIG. 2 may be magnetic, electromagnetic, gravimetric, or other field(s) and the objects must be 'repel-able' by the field-producing source (FPS). The position of object 1 may be maintained and sustained by an appropriate or constant magnetic field of the FPS. The position of object 1 may be varied by varying the field strength of the FPS or object 1. Object 1 may therefore be elevated and manipulated by the FPS. Object 1 may be considered as or may be appropriately positioned about an automotive unit(s), machinery, persons, or other large objects. Hence, as object 1 is elevated, maintained, or manipulated, similarly may an automobile, machinery, persons, or other large objects be elevated, maintained, or manipulated.

Considering FIG. 3, the maximum distance between objects 1 and the FPS is greater in FIG. 3 than in FIG. 2 because of the increased magnet field strength of the FPS in FIG. 3 as compared to that of the FPS in FIG. 2. The distance between objects 1 and the FPS in FIG. 2 and 3 may be decreased by decreasing the magnetic field strength of the FPS or object 1.

Figure 4:
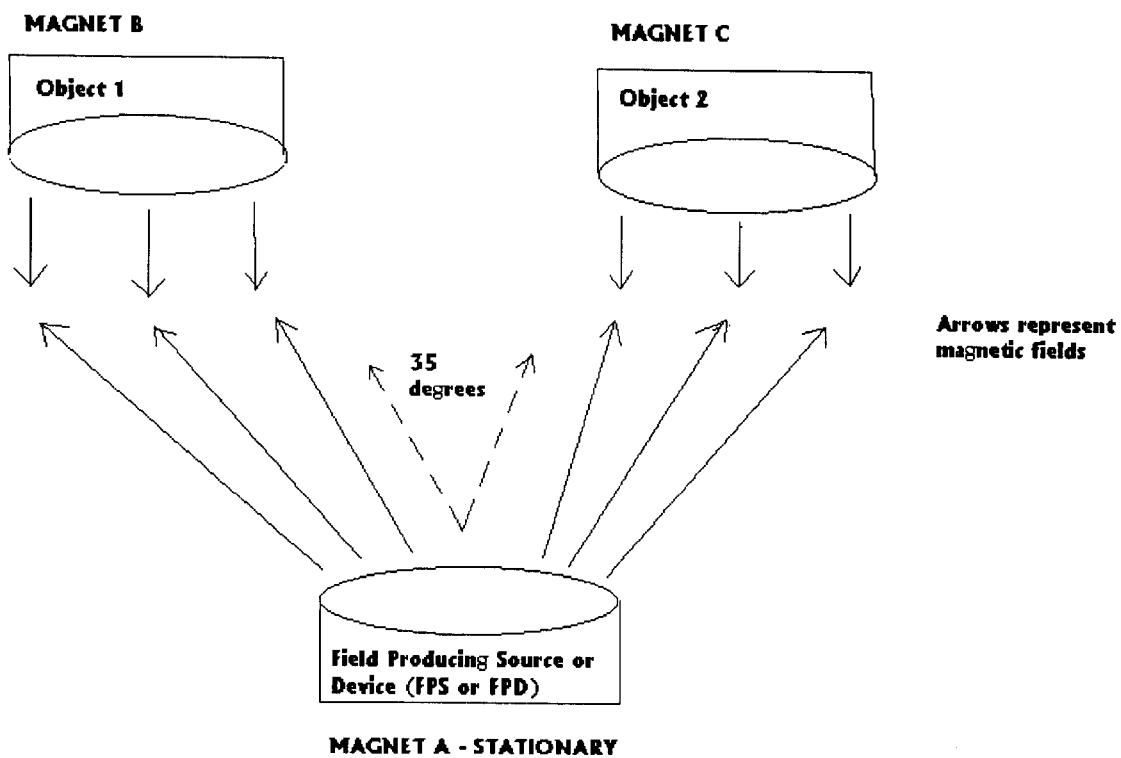
FIG. 4 shows a single, stationary field producing source or device (i.e. Magnet A) exerting a magnetic field at angles in the direction of the magnetic field of objects 1 and 2 (i.e. Magnet B and Magnetic C, respectively).

Considering FIG. 4, the field-producing source may exert a magnetic field on objects 1 and 2 at any angle, direction, or orientation. As in the prior Figures, the position of the objects may be sustained or varied by varying the field strength or direction of the field producing source or device. As shown in FIG. 4, the present invention may composed of multiple objects or field producing sources or devices.

Figure 5:
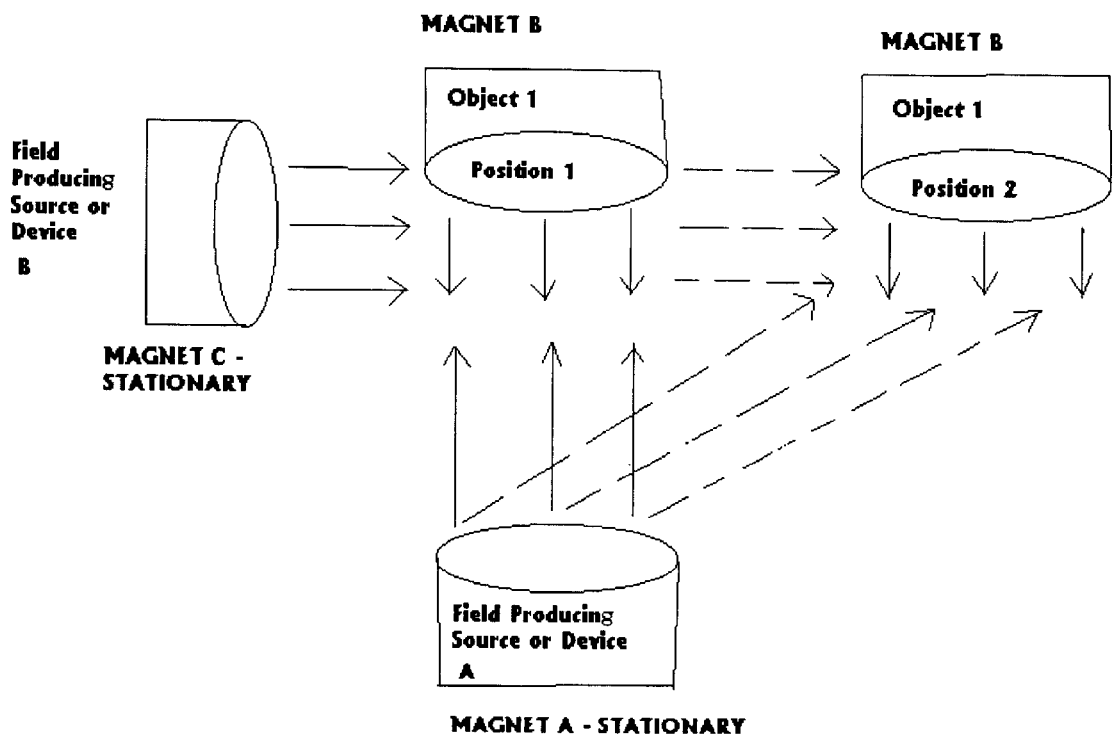
FIGS. 5 and 6 show stationary Magnet A repelling and maintaining Magnet B in position 1. A second stationary Magnet C may exert a magnetic field in the direction of the magnetic field of Magnet B as Magnet A also exerts a magnetic field towards Magnet B. Magnet B may also exert a magnetic field in the direction on one or more of the stationary Magnets.

As shown in FIG. 5 and considering a) the prior illustrations and descriptions and b) the facts that Magnets A and C are in stationary positions, a second field producing source or device (Magnet C) may exert a magnetic field onto the magnetic field produced by object 1 (Magnet B) simultaneously as field producing source or device 1 (Magnet A) exerts a magnetic field on the magnetic field produced by object 1. The result of both field-producing sources exerting magnetic fields onto the magnetic field of object 1 (as shown in FIG. 5) is the manipulation of object 1 from position 1 to position 2. Likewise, in the appropriate environment (high above ground, for example), the manipulation of object 1 by both field producing sources or devices may result in object 1 being viewed as flying (similar to wing and non-wing flight) from position 1 to position 2.

Figure 6:
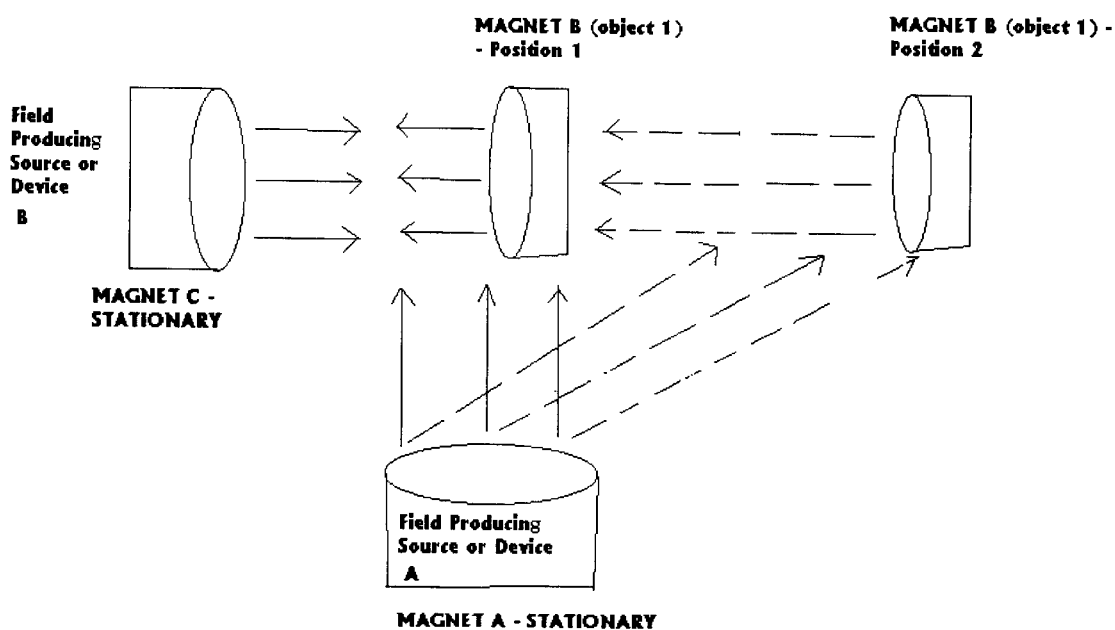

As shown in FIG. 6 and considering the fact that Magnets A and C are stationary and considering the prior illustrations and descriptions, object 1 may be initially sustained in position 1 by the magnetic fields exerted by the stationary field producing sources or devices and by object 1. Increasing the field strength of object 1 in the direction of the magnet field of Magnet C results in the increased repelling of object 1 by Magnet C (or vice versa) and hence the manipulation of object 1 from position 1 to position 2. Object 1 may control its own elevation and manipulation.

Figure 7:
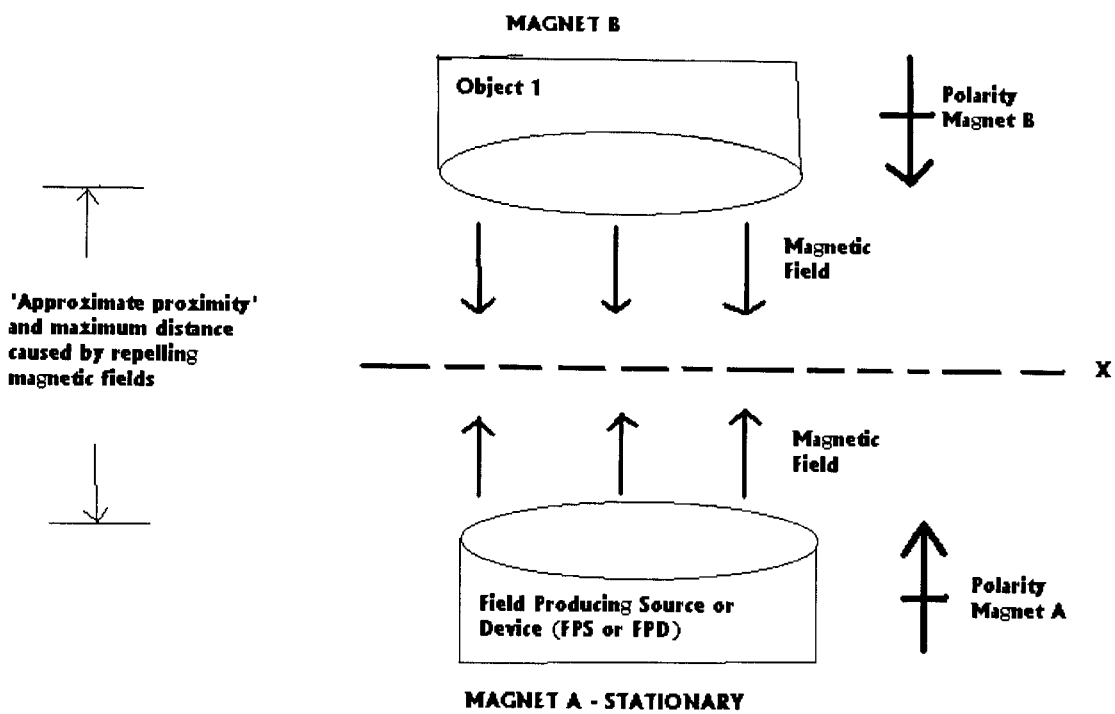
FIG. 7 shows a stationary field producing source or device (Magnet A) positioned below the earth's or other surface exerting a magnetic field towards object 1 (Magnet B) and hence repelling object 1.

Considering FIG. 7, either Magnet, including the field producing source(s) or device(s) or any object or Magnet, may be located below or within the earth's surface, which is represented by 'x', may exert a magnet field onto or in the direction of the magnetic fields of other Magnet(s).

Considering space flight, the present invention is equipped with a large with a large or strong magnet or electromagnet (or other) field-producing upon or above which a space shuttle or other craft may be placed. The space shuttle may be equipped with elevatable materials (such as magnets with the same or similar polarities as the field producing source or device on the bottom of the shuttle facing the field source) distributed about the craft. The magnetic or electromagnetic field of the shuttle is in the direction towards (or may be affected by) the positioned large or strong magnet(s) or electromagnetic(s). The shuttle may be elevated and manipulated by the positioned, large or strong magnetic or electromagnetic field, and the field source(s) or device(s) acting on the space shuttle may contribute to the initial, upward, or other push of the craft. Note that in the case of elevating the space shuttle, the elevation may take place in conjunction with present or fueled modes of space shuttle launching with or without the large solid boosters.

Considering FIG. 8 and a) the prior illustrations and descriptions and b) the space shuttle may be equipped with field producing sources or devices, the space shuttle (object 1) may be elevated and manipulated by the stationary field producing source or device Magnet A. Increasing the strength of the field producing source or device and removing (or reducing the size of) the solid rocket boosters from the space shuttle (object 1) results in an increase in the repulsion between the field producing source or device and the space shuttle (object 1) and hence results in and increase in the distance between the field producing source or device (Magnet A) and the space shuttle (object 1). The space shuttle may therefore be elevated by the field producing source or device. The space shuttle may also be elevated and manipulated as shown in FIGS. 5, 6, and 7.

Considering flight and considering the above descriptions, the present invention is equipped with multiple or very large or strong magnet(s) or electromagnetic(s) (or other field producing sources or devices) over which a single object (such as a flying craft) may be manipulated, elevated, or maintained in an elevated position in vertical, horizontal, angular, and other directions. The objects in FIG. 1 through 8 may be considered the flying craft(s). Considering aircraft flight take-off, aircraft may be elevated vertically only or may be elevated as the craft is taking-off down a runway. In this example, magnets or electromagnets (or other field producing source or device) are positioned along the runway (or elsewhere) exerting the magnetic or electromagnet (or other) field in the direction of the aircraft which is equipped with opposing or elevatable magnetic or electromagnetic (or other) field producing devices or sources (of same or similar polarity as the large field producing source or device) about the craft (same as the runway positioned magnetic or electromagnetic or other field source or device). The field producing source or device positioned on the runway may exert its field strength or energy as to contribute to the vertical or upward or other movement of the aircraft.

Considering FIG. 9 and the descriptions and illustrations associated with FIGS. 1 through 8, field producing sources or devices (FPD) or stationary Magnets (Magnets A through E) may be positioned appropriately along or below the runway or level surface may a magnet field in the direction of Magnet F (i. e. object 1 or the aircraft) as to repel the aircraft as a result of the magnetic fields (i.e. from the FPDs and from the aircraft) repulsion. As the aircraft takes off along the runway, increasing the magnetic strength of the stationary Magnets (i.e. regarding magnet strength, $FPD1<FPD2<FPD3<FPD4<FPD5$) results in an increase in the height of the aircraft above the runway surface (i.e. aircraft $Ht.1<Ht.2<Ht.3<Ht.4<Ht.5$). The aircraft may be elevated and manipulated as described and illustrated in FIGS. 1 through 8.

Considering the elevation and manipulation of objects in general, the present invention is equipped with at least one field producing source or device, such as a field producing magnet, and at least one object, such as a smaller magnet of same or similar polarity, such that the smaller object is positioned (in a stable manner) directly above the large or strong field producing source or device. The field producing source or device contributes to the upward or vertical or other movement, elevation, and manipulation of the object.

Considering a) the elevation and manipulation of persons (or objects) in recreational and other activities, b) materials (or objects) used in construction activities, c) vehicles (objects) used in transportation activities, d) toys or toy components, and e) other conventional modes of object elevation and manipulation, the present invention is equipped with at least one larger or stronger field producing source or device and at least one object which may be elevated or manipulated as described above.

DETAILED DESCRIPTION OF THE DRAWINGS/BEST MODE FOR CARRYING OUT THE INVENTION

FIGS. 1 through 7 show magnetic or electromagnetic field producing sources or devices. The fields may be of a magnetic, gravitational, electric, electromagnetic, or other nature. The magnetic, gravitational, electric, electromagnetic, or other fields produced by the field producing sources or devices move in a particular direction (hence, the phrase 'vectors' may be used to described the fields moving in a particular direction) as to cause the objects to move away from the source during the elevation process. The fields may also manipulate the objects in upward, downward, left or right direction, back and forth, or angular or circular directions along X, Y, or Z axes. The objects are of a field elevatable or manipulatable nature.

The field producing sources or devices shown in FIGS. 1 through 7 are representative of a magnetic or electromagnetic (or other) field producing source or device. A simple example of the field producing source or device is a large, round, flat-faced, permanent magnet. The permanent magnet is positioned such that a second magnet, object 1 (or objects 2 or 3) in FIGS. 1 through 7, are positioned above the large, round, flat-faced permanent magnet, and are repelled by the larger magnet or field producing source or device. The two magnets repel each other because the faces of the magnets with the same polarity face each other. Considering FIG. 2 and considering a) the direction of the magnetic field of each of magnets is in the direction of the polarity of the other magnet and b) the magnets are in close enough proximity to each other, magnets A and B will repel each other. At a distance of maximum repulsion by each of the two magnets, the distance between the two magnets (i.e. the maximum degree of elevation of Magnet B above Magnet A) will be 'constant' or maintained and Magnet B may be levitated.

In all of the drawings, the smaller magnets or objects are positioned as to be repelled in an upward direction. In FIG. 3, Magnet A, in a stationary position, is much larger or powerful than Magnet B, and may exert a greater repelling force on Magnet B than if both magnets were of the same size and power. The objects shown in FIGS. 1 through 7 may be magnets or may be equipped as to be repelled by a magnet of same or similar polarity. The magnetic field produced by the field producing sources or devices may be increased or decreased (or shielded or unshielded, respectively) in an effort to vary the effect of the large permanent magnet on the second (above positioned) magnets or objects. By varying the effects of the large magnet on the second (above positioned) magnets or objects, the field producing sources or devices are capable of elevating one or more of the objects shown in FIGS. 1 through 7. The field producing sources or devices are equipped such that the produced fields are directed towards the field producing source of the objects. The objects shown in FIGS. 1 through 7 are equipped with materials or sources of similar or same magnetic or electromagnetic (or other) fields as the field producing sources or devices.

Considering the above descriptions, the field producing source(s) and device(s) are positioned as to exert its (or their) magnetic (or other) field on or towards the object(s) from and in varying directions. FIG. 4 shows a stationary field producing source or Magnet A exerting its magnetic field in the direction of the magnetic field of two objects or Magnets B and C. The field producing source exerts its magnetic field at a 35 degree angle from object 1 to the field producing source and to object 2. Multiple field producing sources or devices may be positioned as to exert their magnetic (or other) fields on or towards a single object from and in varying directions and in varying degrees; hence the elevated object(s) may be manipulated. As shown in FIGS. 5 and 6, the result of both Magnets A and C simultaneously exerting a magnetic field towards the magnetic field of Magnetic B is the movement or repelling of Magnetic B from position 1 to position 2. The continuation of the magnetic fields of Magnets A and C acting on the magnetic field of object 1 (Magnet B) is depicted by dashed lines in FIGS. 5 and 6. As shown in FIG. 6, Magnet B itself may exert a magnetic field in the direction of the magnetic field of Magnet C as Magnet A exerts its magnetic field towards the magnetic field of Magnet B. This also results in the movement or repelling of object 1 or Magnet B from position 1 to position 2. FIG. 7 shows a stationary field producing source or device (Magnet A) positioned below the earth's surface exerting a magnetic field towards (i.e. in the direction of and in close enough proximity to) object 1 (Magnet B) and hence repelling object 1 in an upward direction. The thickness of the surface between the two magnets A and B in FIG. 7 may be viewed as ranging from infinitesimally small to very large.

Considering flight, the launch of the space shuttle for example, the field producing sources or devices shown in FIGS. 1 through 9 are also representative of launch pads. The launch pads are equipped with very powerful magnetic, electromagnetic, or other field strength. Considering the present invention and the space shuttle, which may be represented by objects 1, 2, and 3 in FIG. 1 and object 1 in FIG. 8, the bottom of the space shuttle (or other appropriate positions about the shuttle) is equipped with magnets or electromagnets having the same or similar polarity as the launch pad or field producing sources or devices. FIG. 8 shows a very large or powerful stationary field producing source or device (Magnet A) exerting a magnetic field (in the direction of and in appropriate proximity to) towards the magnetic field exerted by object 1 (the space shuttle with two solid rocket boosters). The space shuttle is therefore repelled in the opposite direction of the stationary field producing source or device by the field producing source or device. Increasing the strength of the stationary field producing source or device and removing (or reducing the size of) the solid rocket boosters results in a greater repulsion of object 1 (space shuttle) by the field-producing source (Magnet A). With the power or strength of the field producing launch pad reduced or turned off, the space shuttle, which is equipped with magnets or electromagnets of the same polarity as the launch pad field producing source or device, may be placed above or on top of the launch pad. The power or strength of the magnetic field producing source or device may be increased and hence repel (or push up on) the space shuttle. The upward repelling of the space shuttle by the field producing source or device or launch pad contributes to the upward lift or push of the shuttle. Varying the strength of the magnetic field acting on the shuttle, varying the angle at which the magnetic field strikes or affects the shuttle, and varying the number of field producing sources or devices acting upon the shuttle allows the shuttle to be elevated and manipulated.

Figure 9:
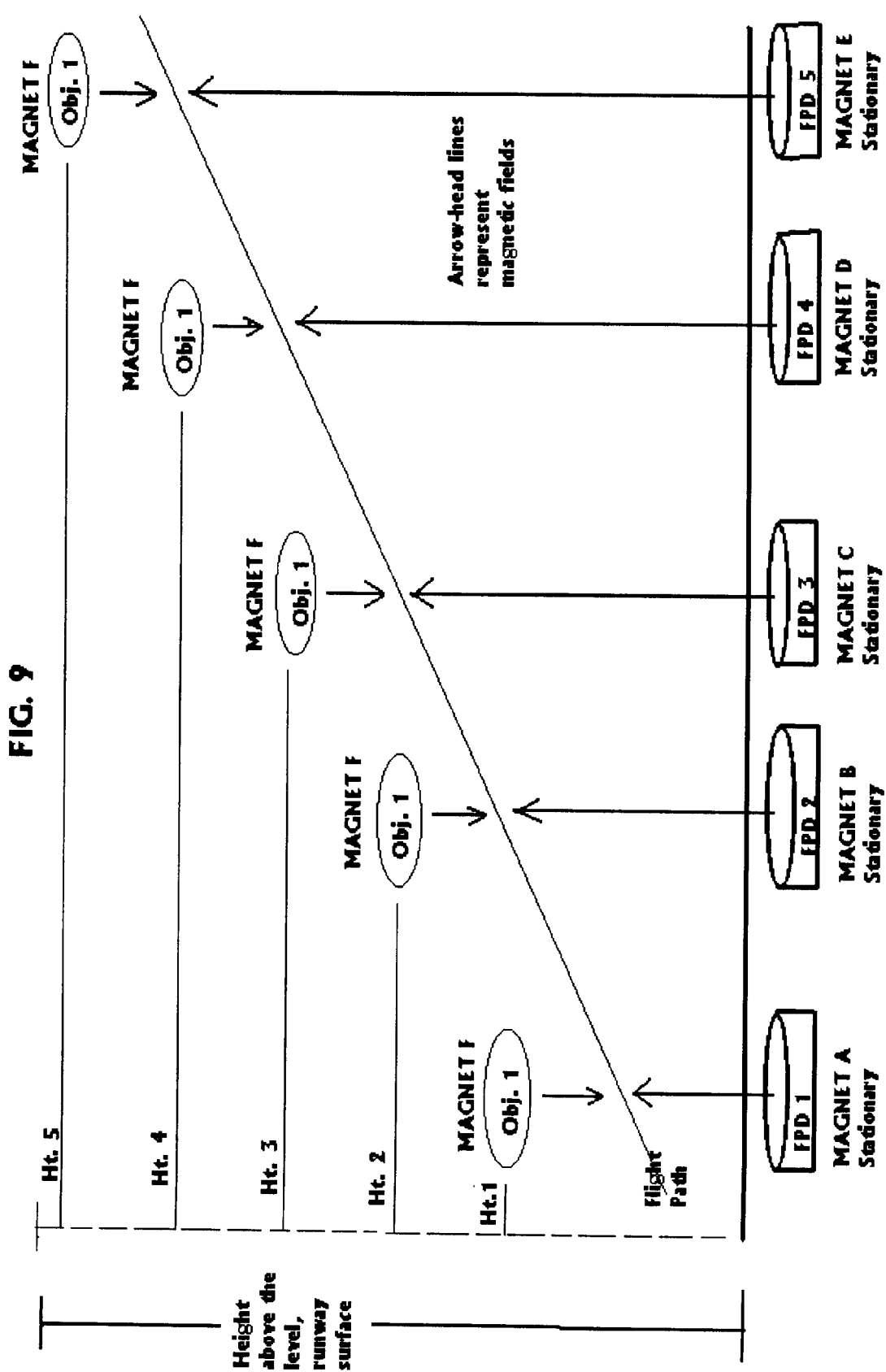
FIG. 9 shows an aircraft (object 1 and Magnet E) going down a runway and taking off as five stationary magnets exert magnetic fields towards object 1 (i.e. Magnet E).

Considering flight, rotary-wing and non-rotary-wing flight for example, the field producing source or device shown in FIG. 9 is representative of the runway or launch pad. Five magnets (Magnets 1 through 5) are positioned just below the surface of the runway. The strength of the magnetic fields of the stationary magnets (Magnets 1 through 5) increase from left to right with Magnet 5 having the strongest magnetic field strength. As the aircraft (object 1 or Magnet E) moves down the runway over the stationary magnets from left to right, the repulsion between the stationary magnets and object 1 increases as the aircraft passes over Magnets A to D. Hence, the distance between the stationary magnets and object 1 increases as the aircraft moves down the runway. The runway or launch pad is equipped with very powerful magnetic, electromagnetic (or other field) strength. The field producing source or device in FIG. 9 represents a runway over which craft may take off. The length of the runway is equipped with magnetic or electromagnetic field producing sources or devices. Considering the present invention and rotary-wing or non-rotary-wing craft, which may be represented the objects in FIGS. 1 through 9, the bottom of the craft (or other appropriate positions about the craft) is equipped with magnets or electromagnets having the same or similar polarity as the runway positioned launch pad or field producing sources or devices. As rotary-wing or non-rotary-wing craft take off down the runway, the power or strength of the field producing sources or devices may be directed towards the craft as they take off. The runway positioned field producing sources or devices are positioned along the runway as the craft takes off. The power or strength of magnetic field producing sources or devices may be increased as the craft speeds down the runway and hence repel (or push up on) the craft and contributing to the lift of the craft. The upward repelling of the craft by the field producing sources or devices along the runway or launch pad contributes to the upward lift or push of the craft as it moves down the runway. Varying the strength of the magnetic field acting on the craft, varying the angle at which the magnetic field strikes or affects the craft, and varying the number of field producing sources or devices acting upon the craft allows the craft to be elevated and manipulated.

Considering the transport of persons or other objects or materials, driving, walking, or using elevators, the field producing sources or devices shown in FIGS. 1 through 7 are representative of a) the road surface in the case of driving, b) the sidewalk or other walking surface in the case of walking, or c) the lifting and lowering source in the elevator shaft beneath the elevator in the case of using elevators. The road surface, sidewalk, or lifting and lowering sources are equipped with very powerful magnets, electromagnets or other field producing sources or devices. Considering the present invention and road transportation, for which automotive or other vehicles may be represented by objects 1, 2, or 3 in FIGS. 1 through 7 and FIG. 8, the bottom of the vehicle (or other appropriate positions about the vehicle) is equipped with magnets or electromagnets having the same or similar polarity as the road surface positioned field producing sources or devices. With the power or strength of the field producing sources or devices turned off, the vehicle, person, or elevator, which are equipped with magnets or electromagnets of the same polarity as the road, sidewalk, or elevator lifting field producing sources or devices, may be placed above or on top of the field producing sources or devices. As the vehicle or person moves along the road or walkway, the power or strength of the magnetic field producing sources or devices may be increased and hence repel (or push up on) the vehicle or person. The upward repelling of the vehicle or person by the field producing source or device contributes to the upward lift or push of the vehicle or person. Varying the strength of the magnetic field acting on the vehicle or person, varying the angle at which the magnetic field strikes or affects the vehicle or person, and varying the number of field producing sources or devices acting upon the vehicle or person allows the vehicle or person to be elevated or manipulated. As depicted in FIGS. 1 through 7, objects may be representative of an elevator with the field producing sources or devices pushing the elevator up the elevator shaft, elevating and maintaining the elevator at a desired position, or lowering the elevator to a desired position.

A very simple manner of making the present invention consists of placing a magnet or field producing device or source in a desired position, shielding the magnet or field with a thin shield, placing the object(s) just above the magnet or field producing device or on or above the thin shield (with same polarities facing each other), and progressively exposing the object(s) to the magnetic field. Progressively opening covered holes (made throughout the thin shield) to expose varying strengths or degrees of the produced field to the objects will cause the object to move or be elevated above the field source and the thin shield. Optimally, the present invention is equipped with technological and other enhancements that will optimize the capabilities of the invention.

I claim:
1. An elevating and manipulating system comprising:
   a first permanent magnetic used to repel and elevate an object;
   means for positioning said object above and in a repelling orientation of a first permanent magnet;
   a second permanent magnet used to repel and manipulate said elevated object;
   means for positioning said second permanent magnet to repel and manipulate said object about the elevated position induced by said first permanent magnet.
2. The elevating and manipulating system of claim 1, wherein the first permanent magnetic and the second permanent magnet are located at direction angles and orientations with regard to said object.
3. The elevating and manipulating system of claim 1, wherein said object may be elevated and manipulated as in flying.
4. The elevating and manipulating system of claim 1, wherein said object may control its own elevation and manipulation.
5. The elevating and manipulating system of claim 1, wherein the first and second permanent magnets and said object receive and emit varying degrees of magnetic field energy.
6. The elevating and manipulating system of claim 1, wherein said object and the permanent magnets are on, below, above or within the earth's surface.
7. The elevating and manipulating system of claim 1, wherein the system may be comprised of multiple objects and multiple first and second permanent magnets.
8. The elevating and manipulating system of claim 1, wherein said object is a permanent magnet.

* * * * *